US012176667B2

(12) United States Patent
Cabañero

(10) Patent No.: US 12,176,667 B2
(45) Date of Patent: *Dec. 24, 2024

(54) ELECTRICAL ASSEMBLY AND METHOD

(71) Applicant: Lear Corporation, Southfield, MI (US)

(72) Inventor: Albert Cabañero, Cebu (PH)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,071

(22) Filed: Apr. 20, 2023

(65) Prior Publication Data

US 2023/0261394 A1 Aug. 17, 2023

Related U.S. Application Data

(63) Continuation of application No. 16/825,494, filed on Mar. 20, 2020, now Pat. No. 11,664,608.

(51) Int. Cl.
*H01R 4/16* (2006.01)
*H01R 43/04* (2006.01)

(52) U.S. Cl.
CPC ............... *H01R 4/16* (2013.01); *H01R 43/04* (2013.01)

(58) Field of Classification Search
CPC ...... H01R 4/182; H01R 43/048; H01R 4/206; H01R 43/04; H01R 4/16
See application file for complete search history.

(56) References Cited

U.S. PATENT DOCUMENTS

| | | | | |
|---|---|---|---|---|
| 3,590,140 | A | 6/1971 | Robb | |
| 5,342,996 | A | 8/1994 | Ito | |
| 6,232,555 | B1 | 5/2001 | Besler | |
| 6,730,848 | B1 | 5/2004 | Antaya | |
| 6,881,104 | B2 | 4/2005 | Suzuki | |
| 9,058,919 | B2 | 6/2015 | Takayama et al. | |
| 10,085,340 | B2 | 9/2018 | Ito | |
| 10,103,454 | B2 * | 10/2018 | Hanazaki | H01R 4/184 |
| 2015/0118917 | A1 * | 4/2015 | Poma | H01R 4/184 439/877 |
| 2017/0346197 | A1 | 11/2017 | Nabeta | |
| 2020/0287300 | A1 | 9/2020 | Li | |

FOREIGN PATENT DOCUMENTS

| | | | | |
|---|---|---|---|---|
| DE | 102017209028 | A1 | 11/2017 | |
| JP | 2009043647 | A | 2/2009 | |
| JP | 5267104 | B2 | 8/2013 | |
| WO | WO2013033978 | A1 | 3/2013 | |
| WO | WO-2016098606 | A1 * | 6/2016 | H01R 11/11 |

* cited by examiner

*Primary Examiner* — Jean F Duverne
(74) *Attorney, Agent, or Firm* — Fishman Stewart PLLC

(57) ABSTRACT

An electrical assembly includes a terminal having a terminal body, a first wing extending from the terminal body, and/or a second wing extending from the terminal body. An electrical assembly may include a conductor in electrical contact with the first wing. The conductor may include a conductive layer and/or an insulative layer. An inner surface of the first wing and/or an outer surface of the first wing may be in direct contact with the conductive layer of the conductor.

20 Claims, 14 Drawing Sheets

ELECTRICAL ASSEMBLY AND METHOD

CROSS-REFERENCE TO RELATED APPLICATION

This application is a continuation of U.S. patent application Ser. No. 16/825,494, filed Mar. 20, 2020, and titled "ELECTRICAL ASSEMBLY AND METHOD", the contents of which are hereby incorporated by reference in its entirety as though fully set forth herein.

TECHNICAL FIELD

The present disclosure generally relates to electrical assemblies, including electrical assemblies that may, for example, be used in connection with planar conductors.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may be relatively complex to use and/or assemble. For example, connecting portions of an electrical assembly with some conductors may involve a complex process and may include many different steps and components. Some electrical assemblies may not be configured for use with generally planar conductors.

There is a desire for solutions/options that minimize or eliminate one or more challenges or shortcomings of electrical assemblies. The foregoing discussion is intended only to illustrate examples of the present field and is not a disavowal of scope.

SUMMARY

In embodiments, an electrical assembly may include a terminal having a f body, a first wing extending from the terminal body, and/or a second wing extending from the terminal body. An electrical assembly may include a conductor in electrical contact with the first wing. The conductor may include a conductive layer and/or an insulative layer. An inner surface of the first wing and/or an outer surface of the first wing may be in direct contact with the conductive layer of the conductor.

With embodiments, a method of assembling an electrical assembly may include disposing an insulative layer of a conductor in contact with a body of a terminal, bending a first wing of the terminal such that an inner surface of the first wing is in contact with a conductive layer of the conductor, disposing the conductive layer of the conductor in contact with an outer surface of the first wing, and/or bending a second wing of the terminal such that an inner surface of the second wing is in contact with the insulative layer of the conductor.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
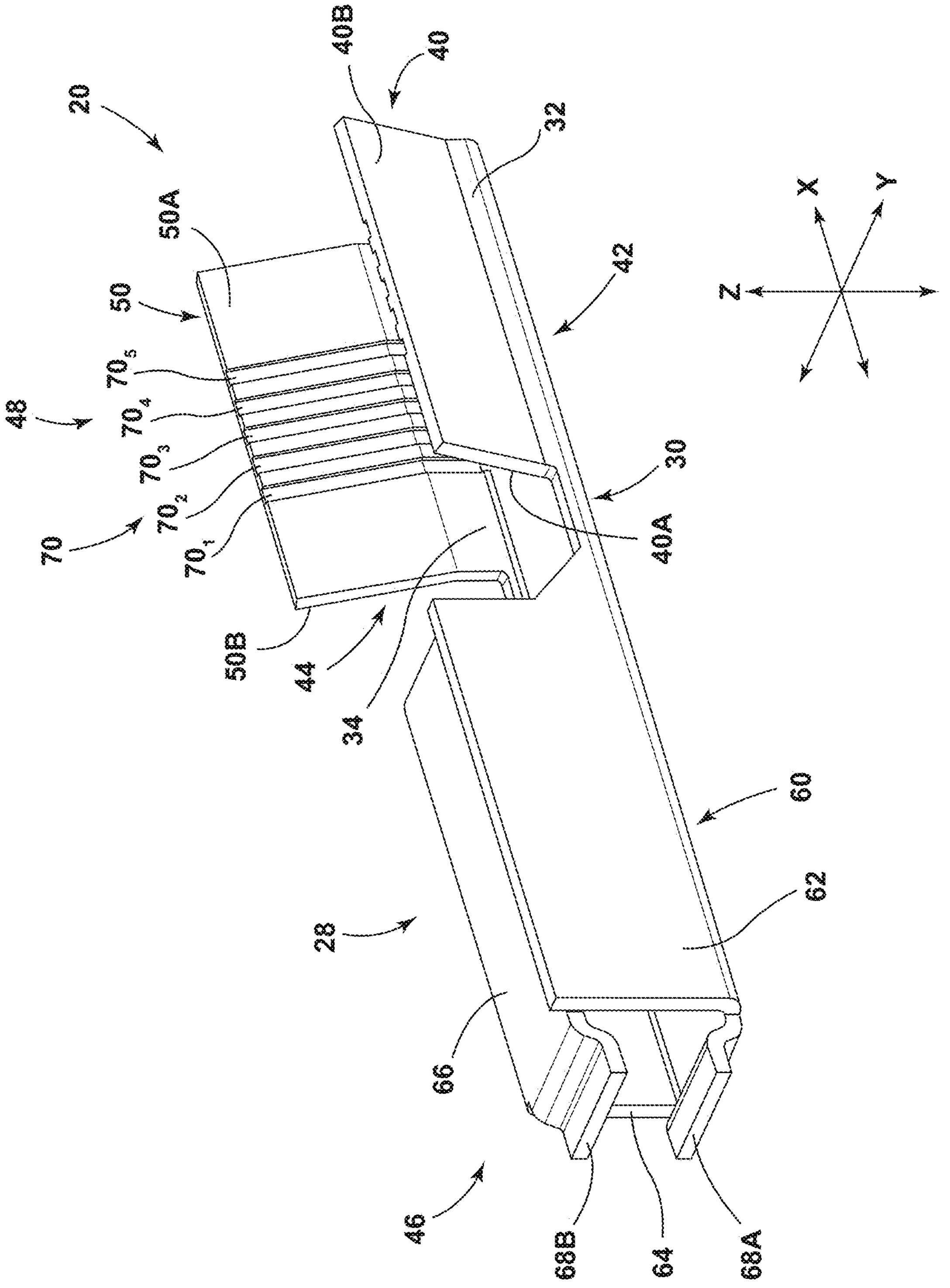
FIG. 1 is a perspective view generally illustrating portions of an embodiment of an electrical assembly according to teachings of the present disclosure.
Figure 2A:
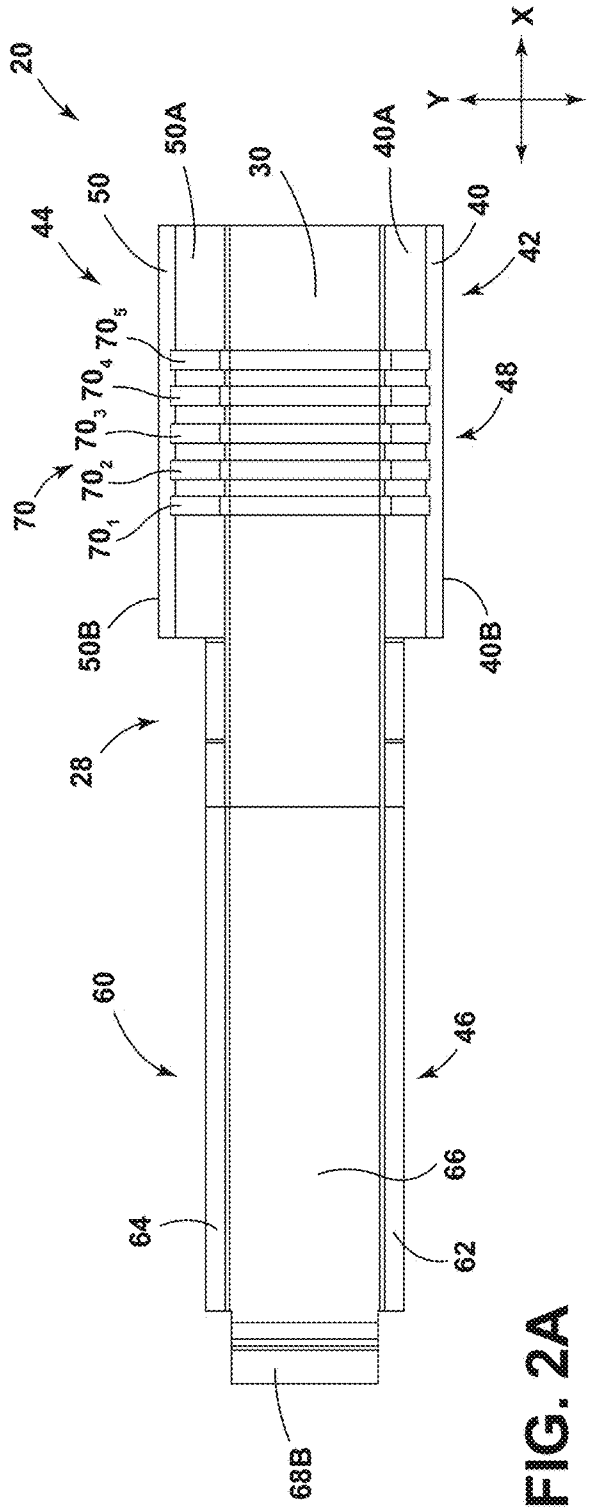
FIG. 2A is a top view generally illustrating portions of an embodiment of an electrical assembly according to teachings of the present disclosure.
Figure 2B:
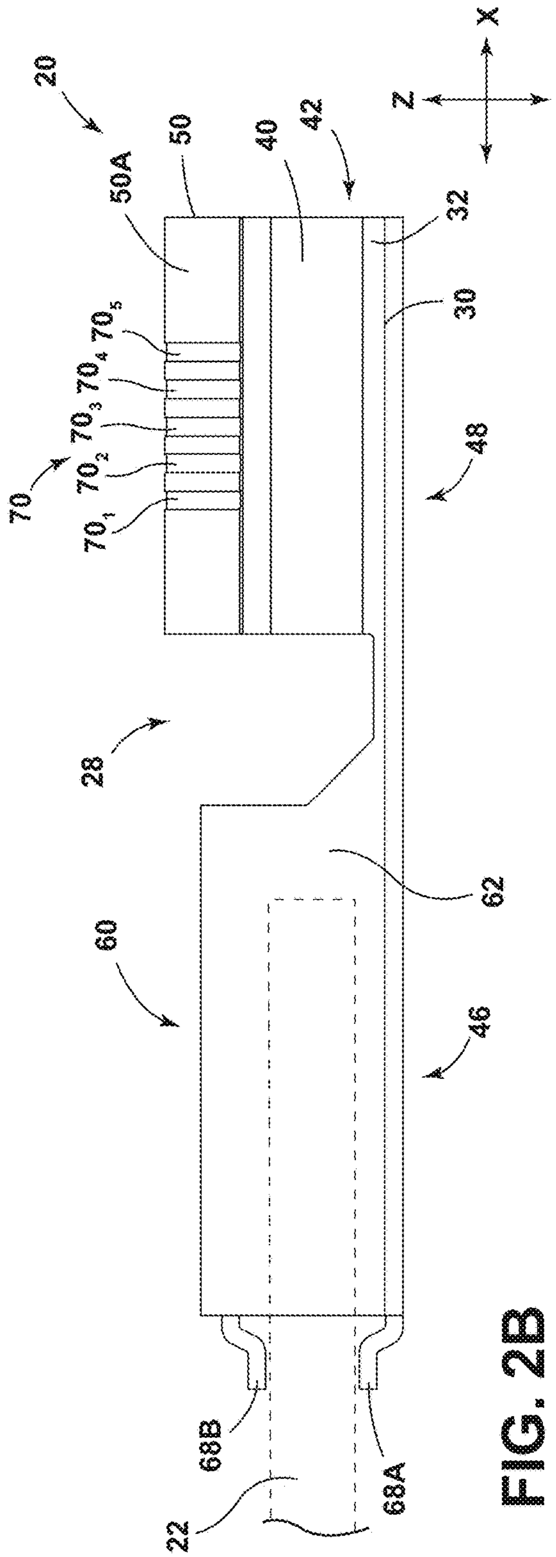
FIG. 2B is a side view generally illustrating portions of an embodiment of an electrical assembly according to teachings of the present disclosure.
Figure 3B:
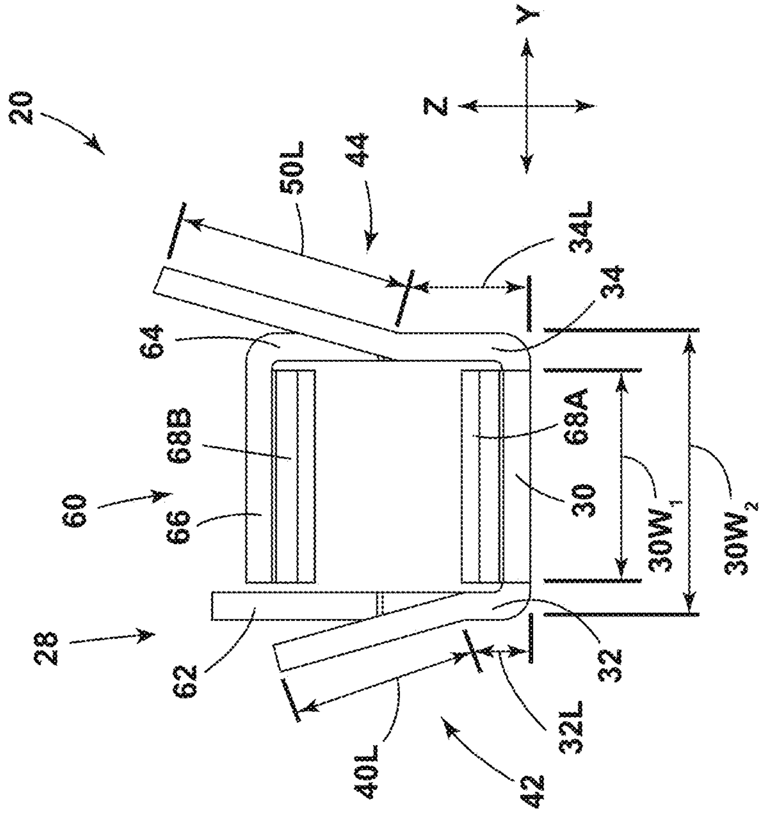
FIG. 3B is a rear view generally illustrating portions of an embodiment of an electrical assembly according to teachings of the present disclosure.
Figure 3A:
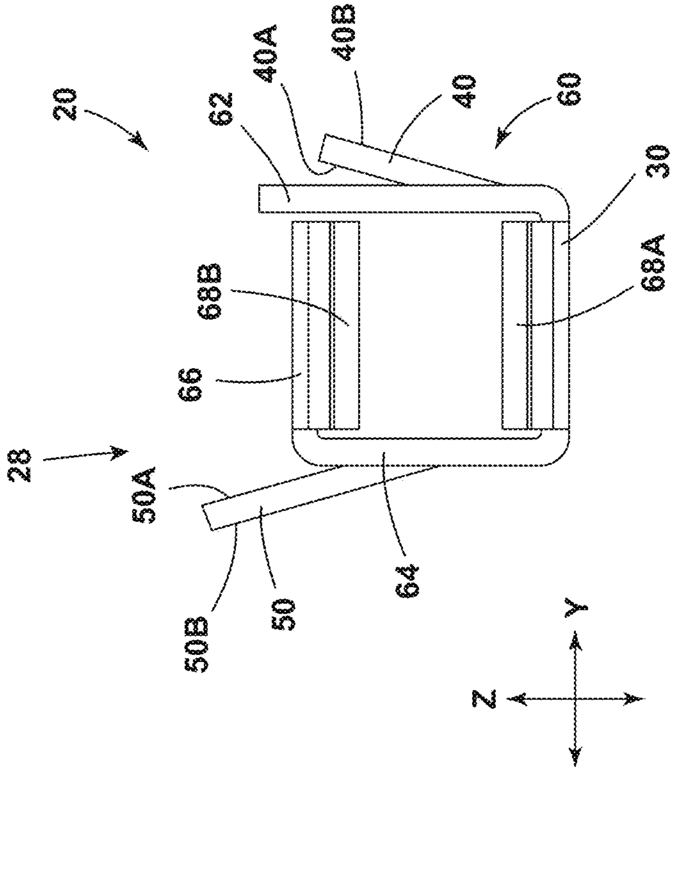
FIG. 3A is a front view generally illustrating portions of an embodiment of an electrical assembly according to teachings of the present disclosure.

In embodiments, such as generally illustrated in FIG. 1, an electrical assembly 20 may include a terminal 28, which may include a terminal body 30, a first wing 40, a second wing 50, and/or a connector portion 60. The connector portion 60 may extend from a first end 46 of the terminal 28. The first wing 40 and/or the second wing 50 may extend from the terminal body 30, such as from a second end 48 of the terminal 28 that may be opposite the first end 46. The connector portion 60 may be electrically connected with the terminal body 30, the first wing 40, and/or the second wing 50. The first wing 40 and the second wing 50 may be configured to facilitate a connection of the terminal 28 with a conductor 80 (see, e.g., FIG. 4). The terminal 28 may, for example and without limitation, be formed as a monolithic (e.g., single, unitary, one-piece) component and/or may be formed (e.g., stamped/bent) from a planar piece of material (e.g., a metal sheet).

With embodiments, such as generally illustrated in FIGS. 1, 2A, 2B, 3A, and 3B, a terminal body 30 may connect (e.g., mechanically and/or electrically) the first wing 40 and/or the second wing 50 with the connector portion 60. The terminal body 30 may include one or more of a variety of shapes, sizes, and/or configurations. For example and without limitation, the terminal body 30 may be substantially planar. The terminal body 30 may extend substantially in an X-direction and a Y-direction. The terminal body 30 may include a first segment 32 and/or a second segment 34. The first segment 32 and/or the second segment 34 may extend substantially in a Z-direction from the terminal body 30 (e.g., substantially perpendicular from the terminal body 30). The first segment 32 may include a length 32L and/or the second segment 34 may include a length 34L (see, e.g., FIG. 3B). The first segment length 32L may be shorter than the second segment length 34L. For example and without limitation, the second segment length 34L may be about twice as long (or more or less) as first segment length 32L. The first wing 40 may extend from (and/or be connected to) the first segment 32. The second wing 50 may extend from (and/or be connected to) the second segment 34. For example and without, the first wing 40 may extend from a lower height (e.g., lower position relative to a Z-direction) than the second wing 50.

In embodiments, the first wing 40 and/or the second wing 50 may extend from the terminal body 30, such as substantially in the Z-direction and/or at an acute angle relative to a Z-direction, at least in an initial configuration. The first wing 40 may extend from a first side 42 of the terminal body 30 and/or the second wing 50 may extend from a second side 44 of the terminal body 30. The first side 42 of the terminal body 30 may be opposite the second side 44 of the terminal body 30 (e.g., in a Y-direction). The first wing 40 and/or the second wing 50 may include one or more of a variety of shapes, sizes, and/or configurations. For example and without limitation, the first wing 40 and/or the second wing 50 may be substantially planar and/or rectangular. The first wing 40 and/or the second wing 50 may, for example, include a conductive, flexible, bendable, and/or metal material (e.g., that may be bent/deformed during one or more crimping/bending operations). For example and without limitation, the first wing 40 and/or the second wing 50 may be configured to bend at or about an end of the first segment 32 and/or an end of the second segment 34, respectively (e.g., where the first wing 40 and the second wing 50 may connect to the first segment 32 and the second segment 34, respectively). The first wing 40 and/or the second wing 50 may be configured to bend while the first segment 32 and/or the second segment 34 may remain substantially fixed (e.g., may remain substantially perpendicular to a remainder of the terminal body 30). For example and without limitation, the first segment 32 and/or the second segment 34 may remain relatively fixed while the first wing 40 and/or the second wing 50 may be deformed, bent, and/or crimped in one or more of a variety of directions and/or manners.

In embodiments, the first wing 40 may include a length 40L and/or the second wing 50 may include a length 50L. The second wing length 50L may be longer than the first wing length 40L (see, e.g. FIG. 3B). For example and without limitation, the length 50L of the second wing 50 may be about 25% (or more or less) longer than the length 40L of the first wing 40. With embodiments, a combined length of the second segment 34 and the second wing 50 may be longer than a combined length of the first segment 32 and the first wing 40. For example and without limitation, a combined length of the second segment 34 and the second wing 50 may be about 40% to about 60% longer than a combined length of the first segment 32 and the first wing 40.

With embodiments, a terminal body 30 may include an inner width $\mathbf{30}W_1$ (e.g., between inner surfaces of segments 32, 34) and/or an outer width $\mathbf{30}W_2$ (e.g., between outer surfaces of segments 32, 34). The length 40L of the first wing 40 may, for example, be about the same as or smaller than the inner width $\mathbf{30}W_1$. The length 50L of the second wing 50 may, for example, be at least a great as or greater than the inner width $W_1$ and/or may be substantially the same as the outer width $W_2$.

With embodiments, such as generally illustrated in FIGS. 1, 2A, 2B, 3A, 3B, a connector portion 60 may be disposed proximate a first end 46 of the terminal 28 and/or the first wing 40 and/or the second wing 50 may be disposed proximate a second end 48 of the terminal 28. The first end 46 of the terminal 28 may be opposite the second end 48 of the terminal 28. The connector portion 60 may include one or more of a variety of shapes, sizes, and/or configurations. For example and without limitation, the connector portion 60 may be substantially rectangular and/or may be substantially hollow. The connector portion 60 may be configured to at least partially receive a mating terminal 22 (e.g., a conductive terminal). The connector portion 60 may connect the conductor 80 with a mating terminal 22, such as to provide an electrical connection between the conductor 80 and one or more of a variety of electrical components (e.g., a circuit board, relays, capacitors, fuses, etc.). The connector portion 60 may include a first wall 62 and/or a second wall 64 (e.g., side walls). The first wall 62 and/or the second wall 64 may be substantially planar; and/or the walls 62, 64 may extend from the terminal body 30 substantially in the Z-direction. The connector portion 60 may include a third wall 66 that may extend from the second wall 64 substantially in the Y-direction. The terminal body 30, the first wall 62, the second wall 64, and/or the third side wall 66 may generally form a rectangular prism.

In embodiments, the connector portion 60 may include a first flange or extension 68A and/or a second flange or extension 68B. The first flange 68A and/or the second flange 68B may be configured to connect with one or more of a variety of electrical components, such as a mating terminal 22 (see, e.g., FIG. 2B). The first flange 68A and/or the second flange 68B may extend in an X-direction, such as from the first wall 62 and/or the third wall 66. The first flange 68A and/or the second flange 68B may include an electrically conductive material. The first flange 68A and/or the second flange 68B may include one or more of a variety of shapes, sizes, and/or configurations. For example and without limitation, the first flange 68A and/or the second flange 68B may be curved, rounded, and/or S-shaped. The first flange 68A and/or the second flange 68B may be configured to deform, bend, and/or flex as the connector portion 60 is connected with a mating terminal 22, which may include one or more of a variety of configurations. For example and without limitation, the flanges 68A, 68B may flex towards each other and/or away from each other depending on the mating terminal 22.

With embodiments, such as generally illustrated in FIGS. 1, 2A, 2B, and 4, the terminal body 30, the first wing 40, and/or the second wing 50 may include one or more grooves 70. The grooves 70 may be disposed on inner surfaces of the terminal body 30, the first wing 40, and/or the second wing 50. The grooves 70 may contact and/or engage a conductor 80. The grooves 70 may, for example and without limitation, include a first groove $\mathbf{70}_1$, a second groove $\mathbf{70}_2$, a third groove $\mathbf{70}_3$, a fourth groove $\mathbf{70}_4$, and/or a fifth groove $\mathbf{70}_5$. The grooves 70 may, for example and without limitation, provide an increased friction interface between a conductor 80 and the terminal body 30 and/or the wings 40, 50 such as to assist in retention of the conductor 80 relative to the terminal 28 (e.g., the grooves 70 may assist in mechanical connection of the conductor 80 with the terminal 28 to at least some degree). The grooves 70 may limit movement of the conductor 80 in at least one direction (e.g., an X-direction). The grooves 70 may extend generally in the Y-direction and/or Z-direction (e.g., perpendicular to an X-direction). The grooves 70 may be disposed generally perpendicular to a longitudinal direction of the conductor 80, which may be substantially parallel to an X-direction) to at least partially limit movement of the conductor 80 in the X-direction. The one or more grooves 70 may extend along the first wing 40, to the terminal body 30 (including segments 32, 34), and to the second wing 50 (e.g., a single groove 70 may extend along some or all of the terminal body 30, the first wing 40, and/or the second wing 50, such as in a continuous manner). Additionally or alternatively, a groove 70 may include separate portions, such as in each of the terminal body 30, the first wing 40, and/or the second wing 50. The grooves 70 may include one or more of a variety of shapes, sizes, and/or configurations. For example and without limitation, the grooves 70 may be generally rectangular.

Figure 4:
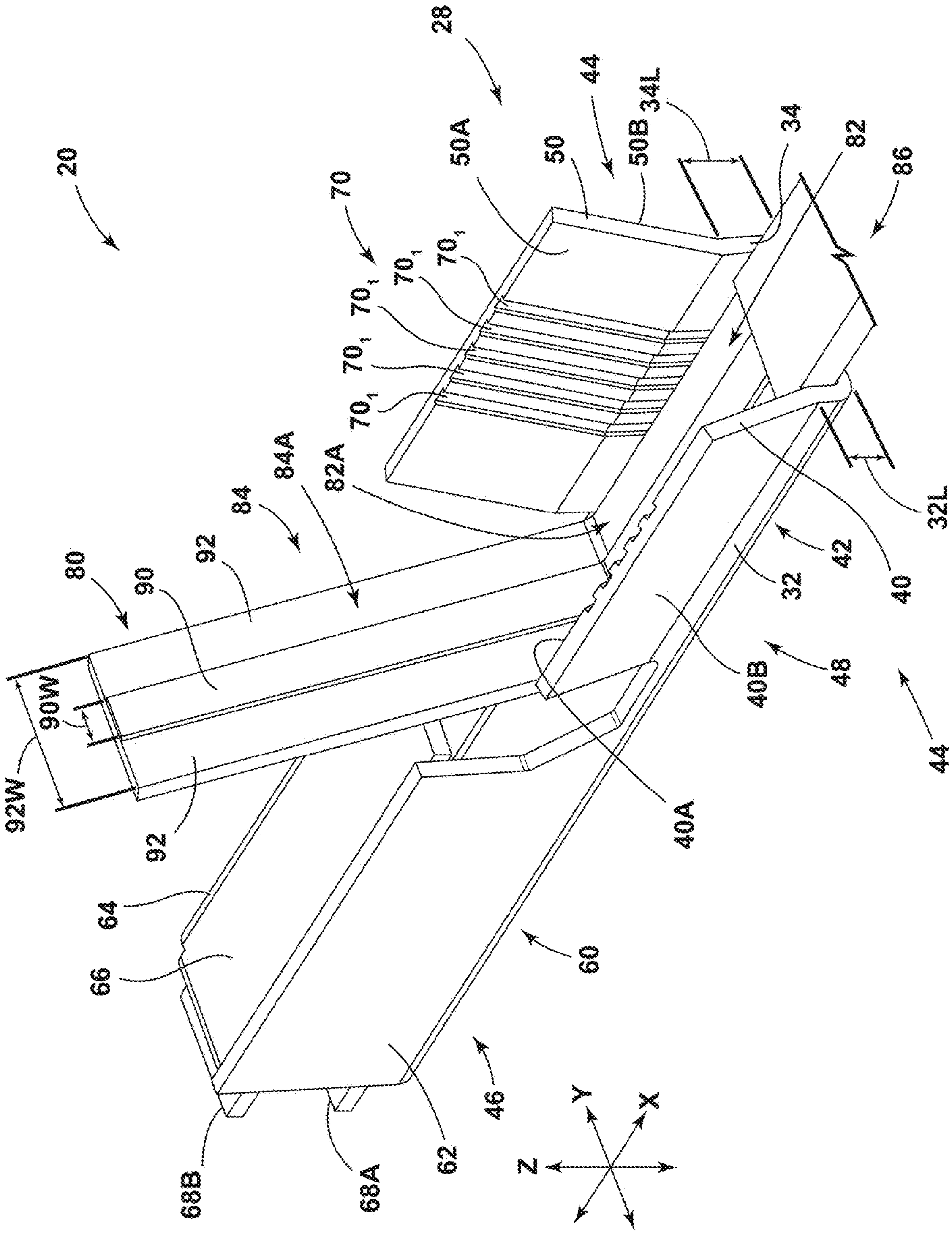
FIG. 4 is a perspective view generally illustrating portions of an embodiment of an electrical assembly according to teachings of the present disclosure.
Figure 5:
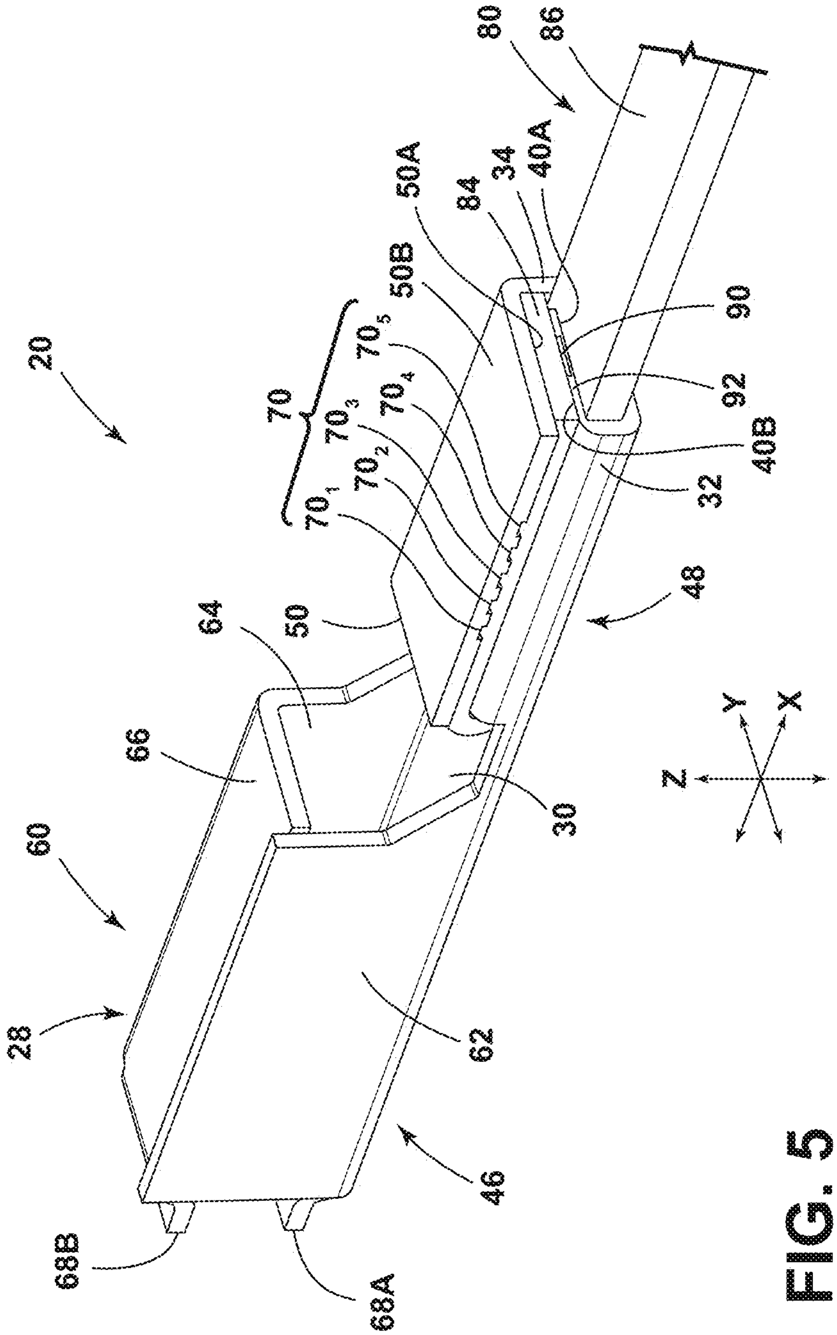
FIG. 5 is a perspective view generally illustrating portions of an embodiment of an electrical assembly according to teachings of the present disclosure.

In embodiments, such as generally illustrated in FIGS. 4 and 5, an electrical assembly 20 may include a conductor 80. The terminal 28 may be configured to at least partially retain the conductor 80 (e.g., limit movement in at least one direction). The terminal 28 may provide an electrical connection between the conductor 80 and the connector portion 60. For example and without limitation, the conductor 80 may be electrically connected with the connector portion 60 (and/or a mating terminal 22 connected thereto) via the terminal body 30 and/or the first wing 40. With some embodiments, the second wing 50 may not electrically connect with the conductor 80, and/or the second wing 50 may be configured to mechanically retain the conductor 80. The conductor 80 may include one or more of a variety of shapes, sizes, and/or configurations. For example and without limitation, the conductor 80 may be substantially planar, and/or may be disposed, at least in part, in parallel contact (e.g., mechanical and/or electrical contact) with the terminal body 30. In embodiments, such as generally shown in FIG. 5, the conductor 80 may be substantially flat such that when connected with the terminal body 30, the first wing 40, and/or the second wing 50, the conductor 80, the terminal body 30, the first wing 40, and/or the second wing 50 may be substantially parallel. The conductor 80 may include a first layer/portion 90 (e.g., an inner conductive layer) and/or a second layer/portion 92 (e.g., an outer insulative layer).

With embodiments, such as generally illustrated in FIGS. 4 and 5, a conductor 80 may include a first connection portion 82, a second connection portion 84, and/or a body 86. The first connection portion 82 may be connected to and/or disposed at an end of the body 86. The second connection portion 84 may be connected to and/or extend from an end of the first connection portion 82. The first connection portion 82 may be disposed at least partially between the body 86 and/or the second connection portion 84. The first connection portion 82 may be configured for electrical and/or mechanical connection with the terminal body 30 and/or the first wing 40. The second connection portion 84 may be configured for electrical connection with the first wing 40 and/or mechanical connection with the second wing 50. The first connection portion 82 and the second connection portion 84 may move with respect to each other. For example and without limitation, the second connection portion 84 may rotate and/or or pivot about 180 degrees relative to the first connection portion 82. The second connection portion 84 may be configured to bend such that the first connection portion 82 and/or the second connection portion 84 overlap in the Z-direction and/or are substantially antiparallel in an assembled/crimped configuration (see, e.g., FIG. 5).

In embodiments, such as generally illustrated in FIG. 4, a conductor 80 may include a first layer 90 and/or a second layer 92. The first layer 90 may be configured as a conductor layer and/or may include one or more of a variety of electrically conductive materials. The second layer 92 may be configured as an insulator layer and/or may include one or more of a variety of electrically insulating materials. The first layer 90 may be disposed substantially parallel with the second layer 92. The first layer 90 may be disposed substantially along a middle portion of the conductor 80 and/or the second layer 92. The first layer 90 may include a width 90W and/or the second layer 92 may include a width 92W. The first layer width 90W may be less than the second layer width 92W such that the first layer 90 may not extend beyond the second layer 92 in a Y-direction. For example and without limitation, the first layer 90 may be configured such that it will not contact the first segment 32 and/or the second segment 34 of the terminal body 30 in some or most circumstances. The first layer 90 (e.g., the conductive layer) may be configured to be in electrical and/or direct contact with the first wing 40 from a Z-direction (e.g., may move generally vertically downward into contact with the first wing 40).

With embodiments, such as generally illustrated in FIG. 4, a first connection portion 82 and/or a second connection portion 84 may include exposed portions of the first layer 90 (e.g., the conductive layer). For example and without limitation, the first layer 90 may not be exposed throughout the body 86 of the conductor 80 (e.g., may be enclosed by the second layer 92). The first layer 90 (e.g., the conductive layer) may be exposed along a surface of the first connection portion 82 and/or the second connection portion 84, such as to electrically connect with the terminal 28. For example and without limitation, the second layer 92 may be stripped partially (e.g., a top portion/half or a bottom portion/half) or entirely away from the first layer 90 in the first connection portion 82 and/or the second connection portion 84.

Figure 6A:
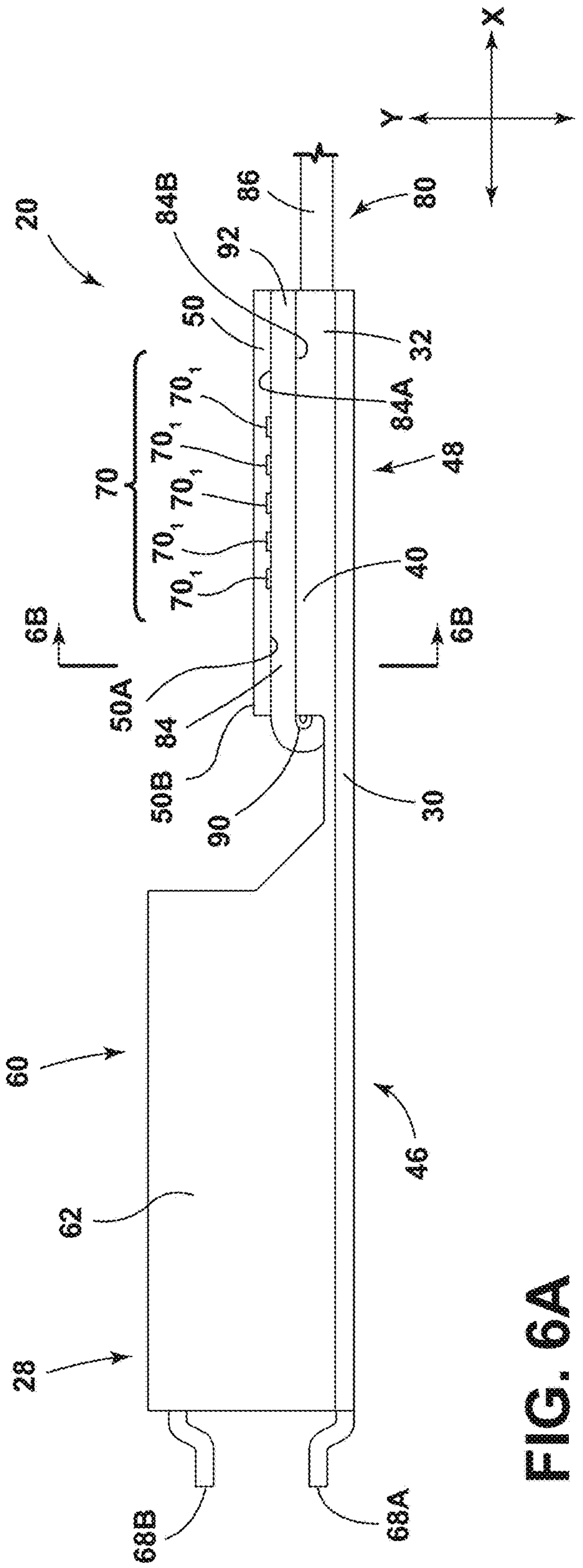
FIG. 6A is a side view generally illustrating portions of an embodiment of an electrical assembly according to teachings of the present disclosure.
Figure 6B:
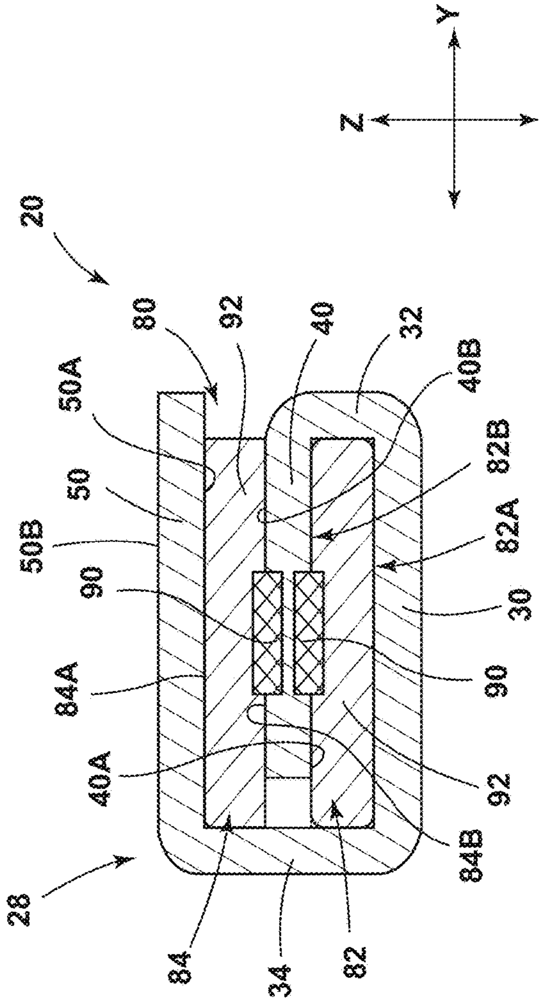
FIG. 6B is a cross-sectional view taken along the section line 6B-6B of FIG. 6A that generally illustrates portions of an embodiment of an electrical assembly according to teachings of the present disclosure.

In embodiments, such as generally illustrated in FIGS. 5, 6A, and 6B, an electrical assembly 20 may include a conductor 80 mechanically retained relative to a terminal 28 via the first wing 40, the second wing 50, and/or the terminal body 30. A first surface 82A of the first connection portion 82 may be in contact with the terminal body 30. The first surface 82A may comprise portions of the second layer 92, which may include electrically insulating material, so the first surface 82A may be in contact with the terminal body 30 without providing an electrical connection between the terminal body 30 and the conductor 80 (e.g., the contact/connection may be mechanical and not electrical). The first surface 82A of the first connection portion 82 may be in contact with the one or more grooves 70 of the terminal 28, such as to facilitate mechanically retaining the conductor 80 relative to the terminal 28.

With embodiments, a second surface 82B of the first connection portion 82 may be in contact (e.g., electrical and/or direct contact) with the inner surface 40A of the first wing 40, which may include one or more grooves 70 and/or portions thereof. The second surface 82B may comprise portions of the first layer 90, which may include electrically conductive material, and/or contact between the second surface 82B and the inner surface 40A may provide an electrical connection between the conductor 80 and the terminal 28.

In embodiments, a first surface 84A of the second connection portion 84 may be in contact with the inner surface 50A of the second wing 50. The first surface 84A may, for example, include electrically insulating material (e.g., of the second layer 92), and/or contact between the first surface 84A and the inner surface 50A may not provide an electrical connection between the terminal 28 and the conductor 80. The first surface 84A of the second connection portion 84 may contact one or more grooves 70 of the inner surface 50A of the second wing 50, such as to facilitate mechanically retaining the conductor 80 relative to the terminal body 30, the first wing 40, and/or the second wing 50.

With embodiments, a second surface 84B of the second connection portion 84 may be in contact (e.g., electrical and/or direct contact) with an outer surface 40B of the first wing 40. The second surface 84B may, for example, include electrically conductive material (e.g., of the first layer 90), and/or the contact between the second surface 84B and the outer surface 40B may provide an electrical connection between the terminal 28 and the conductor 80. An outer surface 50B of the second wing 50 may, at least in some circumstances, not be in contact with the conductor 80.

With embodiments, such as generally illustrated in FIG. 6B, a first connection portion 82 may be disposed substantially between (e.g., in the Z-direction) a terminal body 30 and a first wing 40. The first wing 40 may be disposed substantially between (e.g., in the Z-direction) the first connection portion 82 and the second connection portion 84. The second connection portion 84 may be disposed substantially between (e.g., in the Z-direction) the first wing 40 and the second wing 50. The first connection portion 82, the second connection portion 84, and/or the first wing 40 may be disposed substantially between (e.g., in the Z-direction) the terminal body 30 and the second wing 50. For example and without limitation, portions of the terminal body 30, the first connection portion 82, the first wing 40, the second connection portion 84, and the second wing 50 may overlap in the Z-direction and/or may be disposed in an overlapping configuration that may, for example, include five layers.

In embodiments, such as generally illustrated in FIG. 6B, in an assembled (e.g., connected, crimped, etc.) configuration, portions of the first layer 90 may be pressed and/or disposed at least partially into the first wing 40. For example and without limitation, the distance between the first layer 90 in the first connection portion 82 and the first layer 90 in the second connection portion 84 may be less than a thickness of the first wing 40 in some assembled configurations. Additionally or alternatively, the conductor 80 (e.g., the first layer 90 and/or the second layer 92) may be deformed, at least to some degree, during and/or as a result of bending/crimping the wings 40, 50.

With embodiments, an electrical assembly 20 may include a terminal 28 that may include a terminal body 30, a first wing 40, a second wing 50, and/or a connector portion 60, and/or the electrical assembly 20 may include a conductor 80. Assembling/connecting the terminal 28 with a conductor 80 may be conducted, at least in part, via a bending die.

In embodiments, such as generally illustrated in FIGS. 7A-12, a bending die 120 may include an upper portion 120A and/or a lower portion 120B. The lower portion 120B may, for example, be configured to contact an outer surface 30A of the terminal body 30. The upper portion 120A may be configured to contact the first wing 40 and/or the second wing 50. The upper portion 120A and the lower portion 120B may be configured to move relative to each other during assembly of an electrical assembly 20. For example and without limitation, the lower portion 120B may be relatively fixed and the upper portion 120A may move toward the lower portion 120B. The lower portion 120B may be configured to at least partially retain the electrical assembly 20 during assembly (e.g., bending, crimping, and/or deformation). The lower portion 120B may include a first protrusion 122 and/or a second protrusion 124 that may extend substantially in the X-direction and/or the Z-direction. The first protrusion 122 and/or the second protrusion 124 may be configured to at least partially limit movement of the electrical assembly 20 in one or more directions, such as a Y-direction. The first protrusion 122 may contact/engage the terminal body 30 and/or the first segment 32. The second protrusion 124 may contact/engage the terminal body 30 and/or the second segment 34. The electrical assembly 20 may be disposed at least partially between (e.g., in a Z-direction) the lower portion 120B and the upper portion 120A of the bending die 120.

In embodiments, such as generally illustrated in FIGS. 7A-12, an upper portion 120A of a bending die 120 may include a first portion 130, a second portion 132, a third portion 134, and/or a fourth portion 136. The first portion 130, the second portion 132, and/or the third portion 134 may be configured to move in the Z-direction, such as independently from each other, during assembly. The first portion 130, the second portion 132, and/or the third portion 134 may include one or more of a variety of shapes, sizes, and/or configurations. For example and without limitation, the first portion 130 may include one or more planar surfaces, and/or may be substantially triangular, such as with a thickness (e.g., in an X-direction) that tapers down toward the lower portion 120B. The second portion 132 and/or the third portion 134 may, for example and without limitation, be generally rectangular, triangular, and/or may include one or more planar surfaces. The third portion 134 may include a C-shaped profile (e.g., when viewed from a Z-direction) such that the third portion 134 may receive at least part of the second portion 132. The second portion 132 and the third portion 134 may cooperate and/or be connected, at least in some circumstances, to provide a C-shaped configuration (e.g., when viewed from an X-direction) that may be configured to at least partially receive the terminal 28.

Figure 7A:
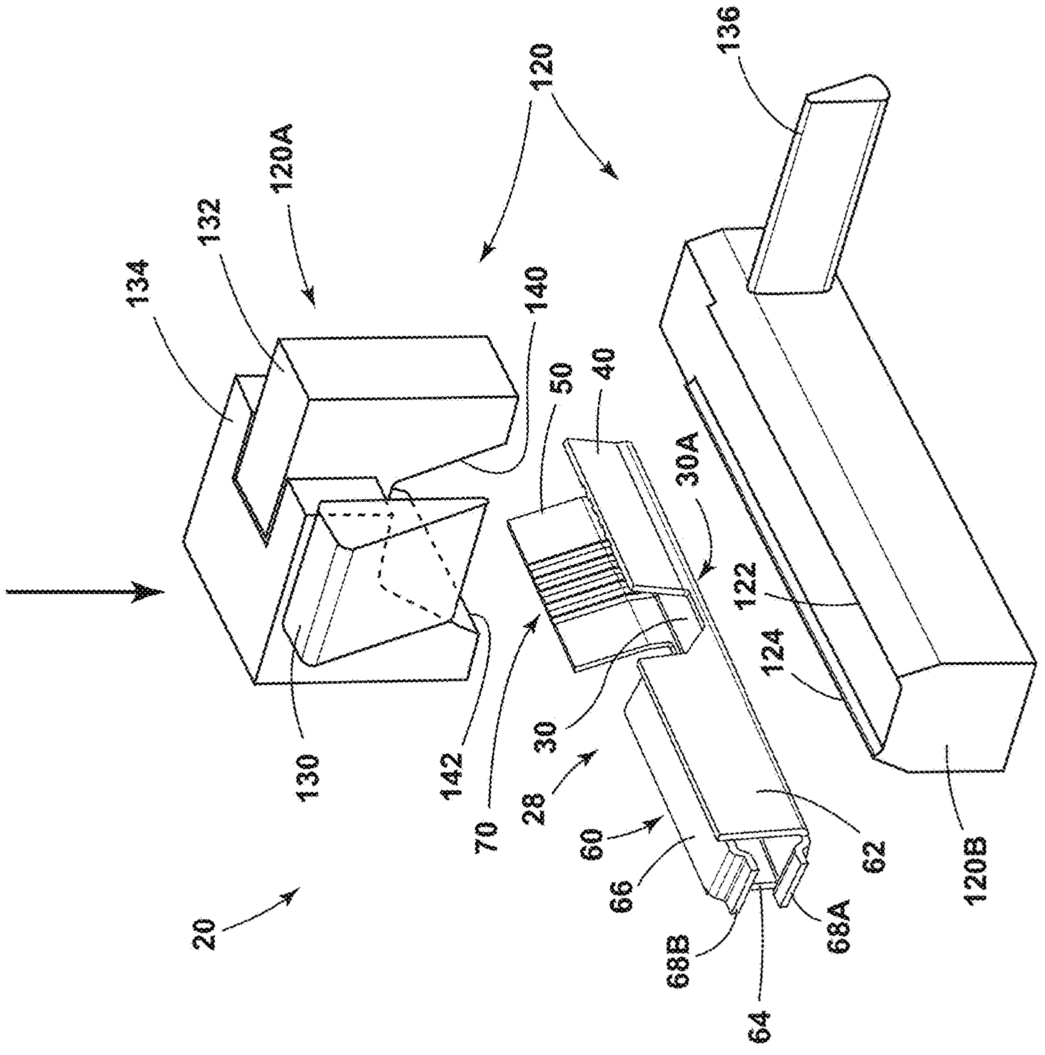
FIG. 7A is a perspective view generally illustrating portions of embodiments of an electrical assembly and a die according to teachings of the present disclosure.
Figure 7B:
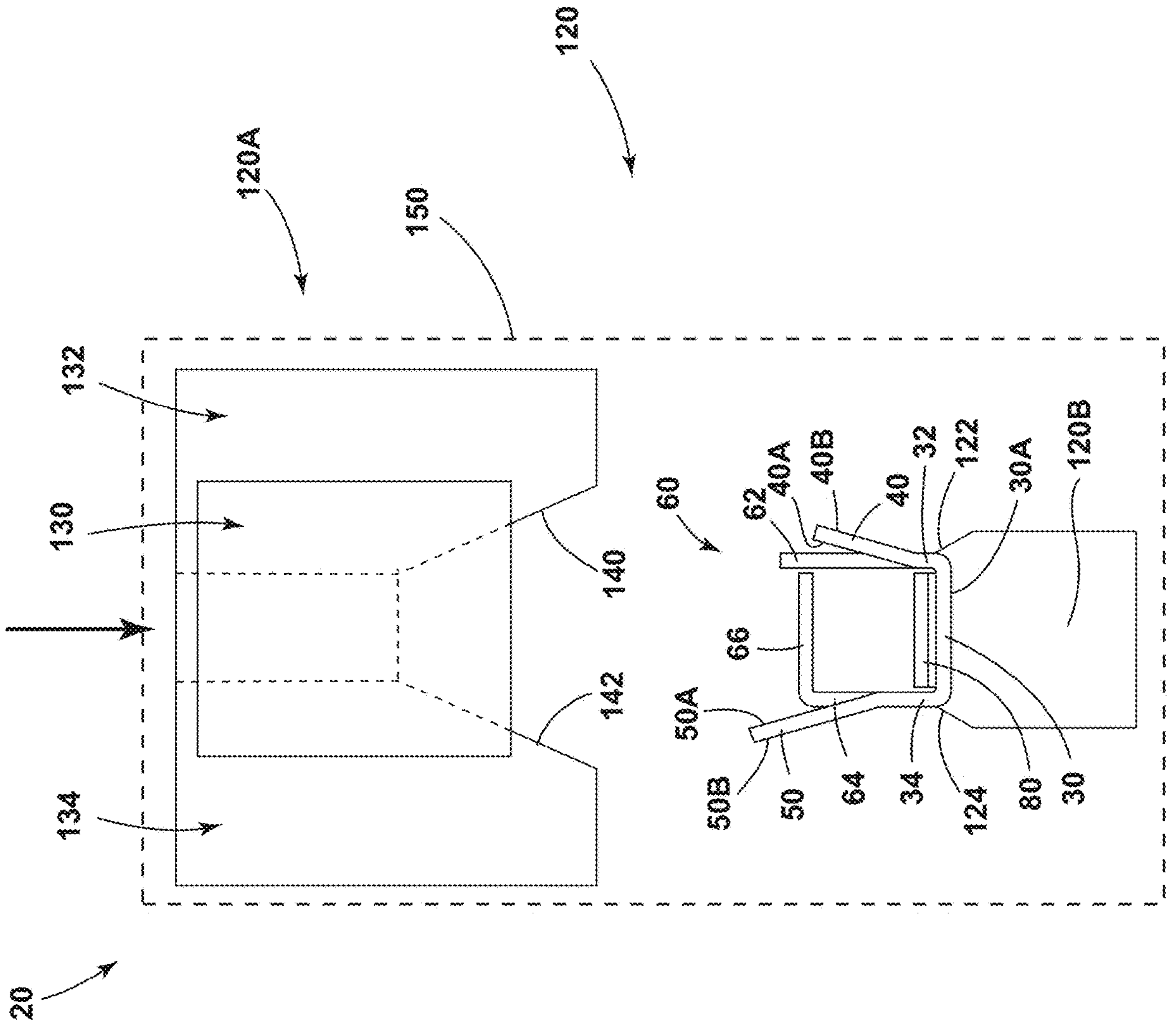
FIG. 7B is a front view generally illustrating portions of embodiments of an electrical assembly and a die according to teachings of the present disclosure.
Figure 9:
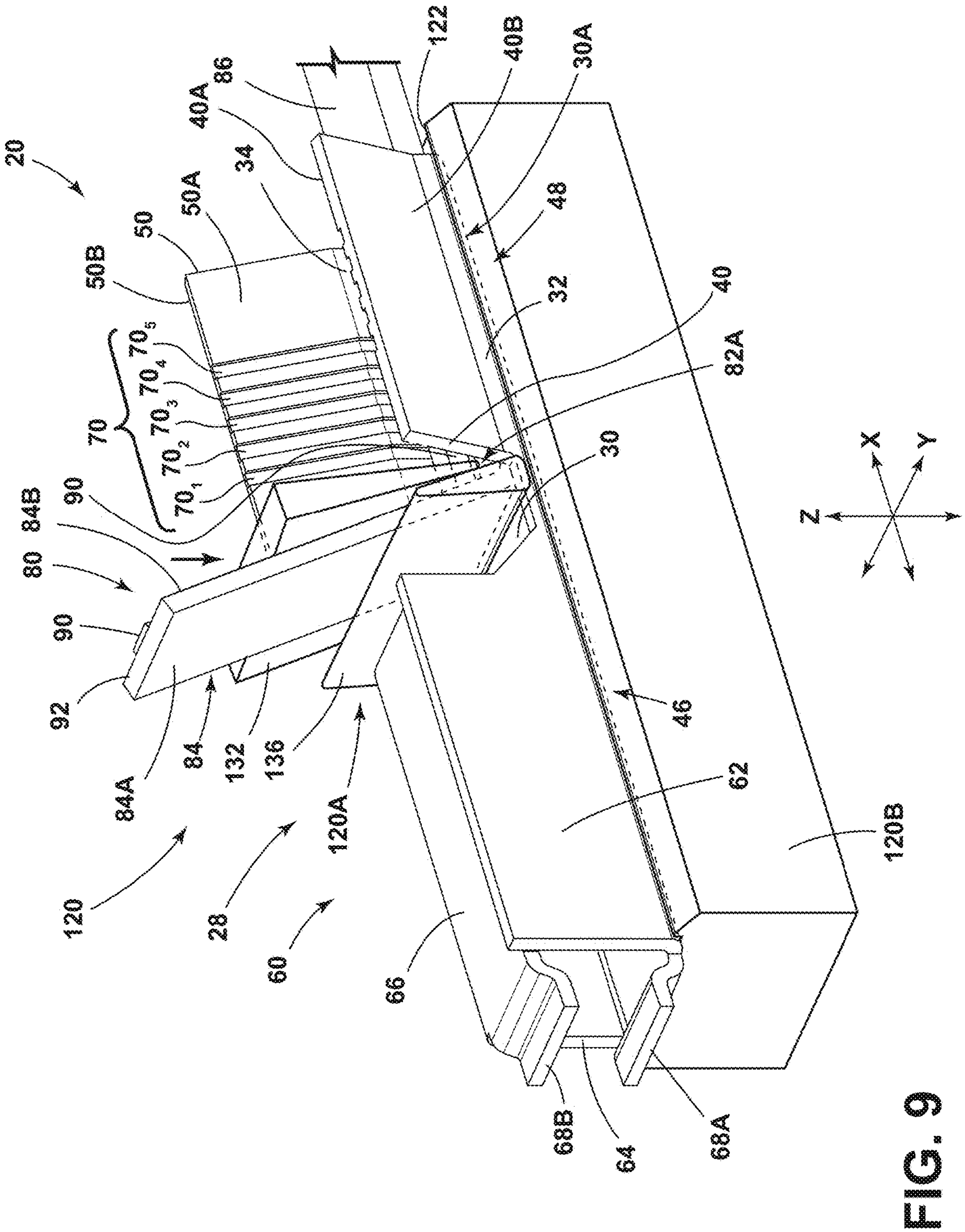
FIG. 9 is a perspective view generally illustrating portions of embodiments of an electrical assembly and a die according to teachings of the present disclosure.
Figure 10:
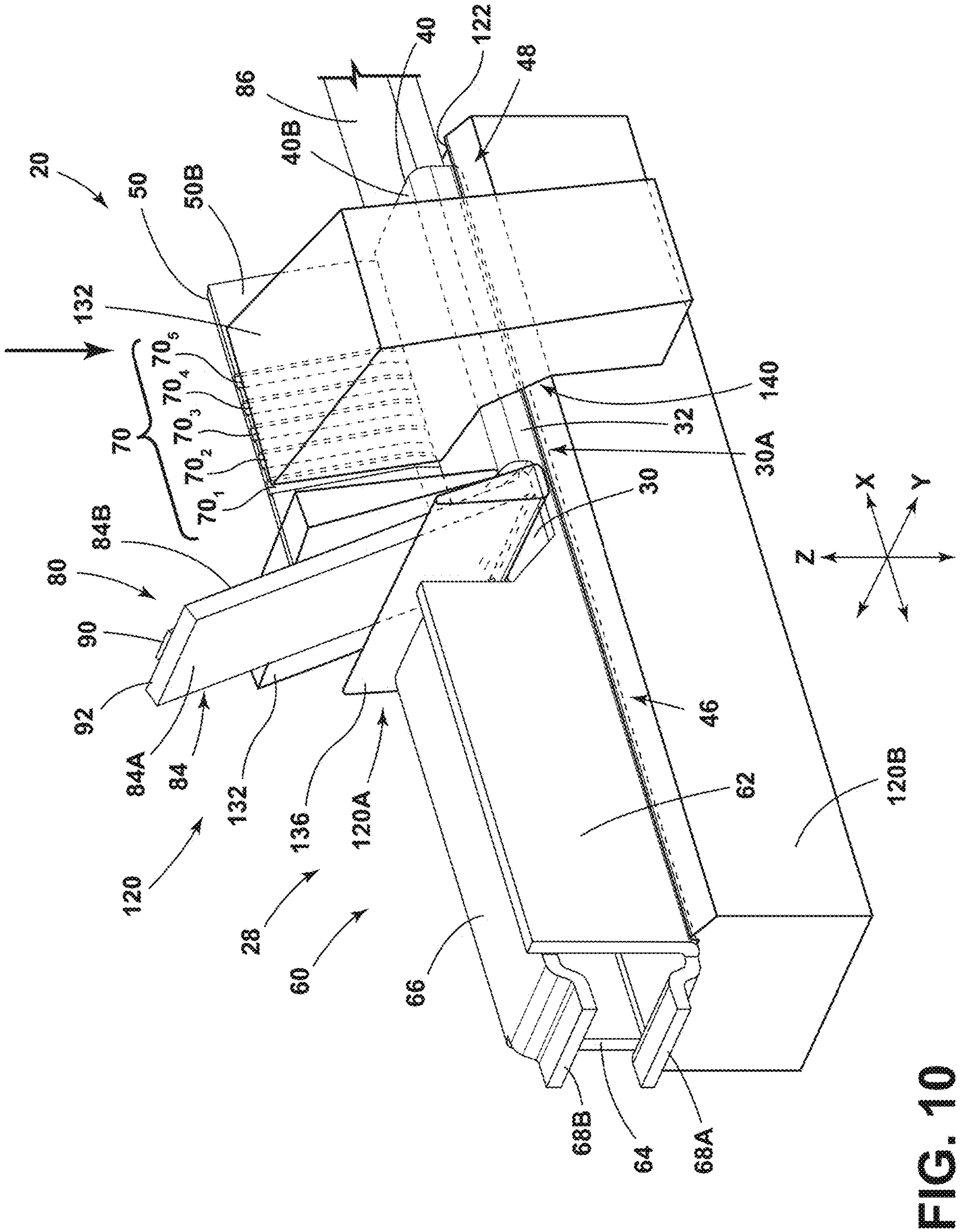
FIG. 10 is a perspective view generally illustrating portions of embodiments of an electrical assembly and a die according to teachings of the present disclosure.
Figure 11:
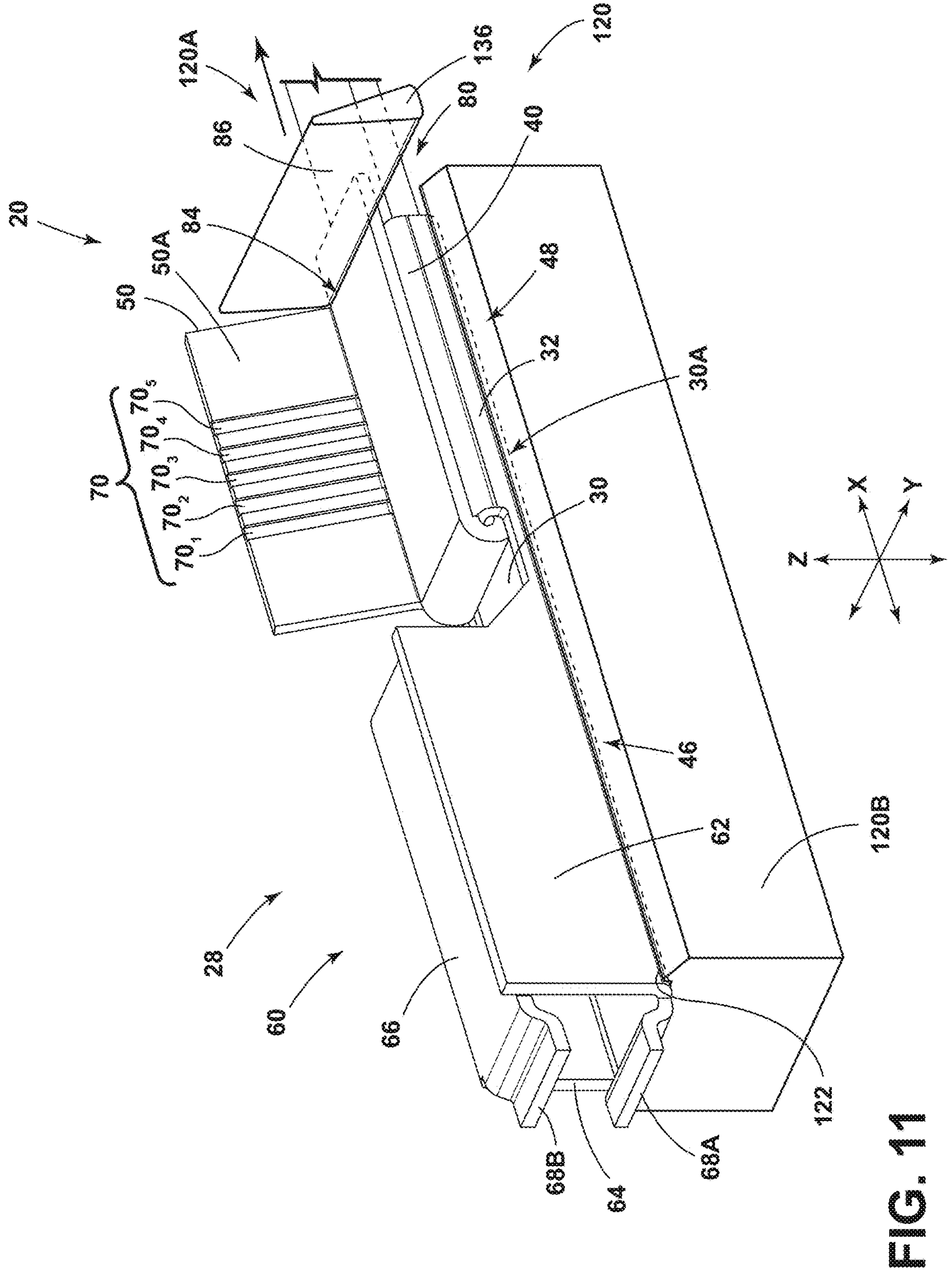
FIG. 11 is a perspective view generally illustrating portions of embodiments of an electrical assembly and a die according to teachings of the present disclosure.
Figure 12:
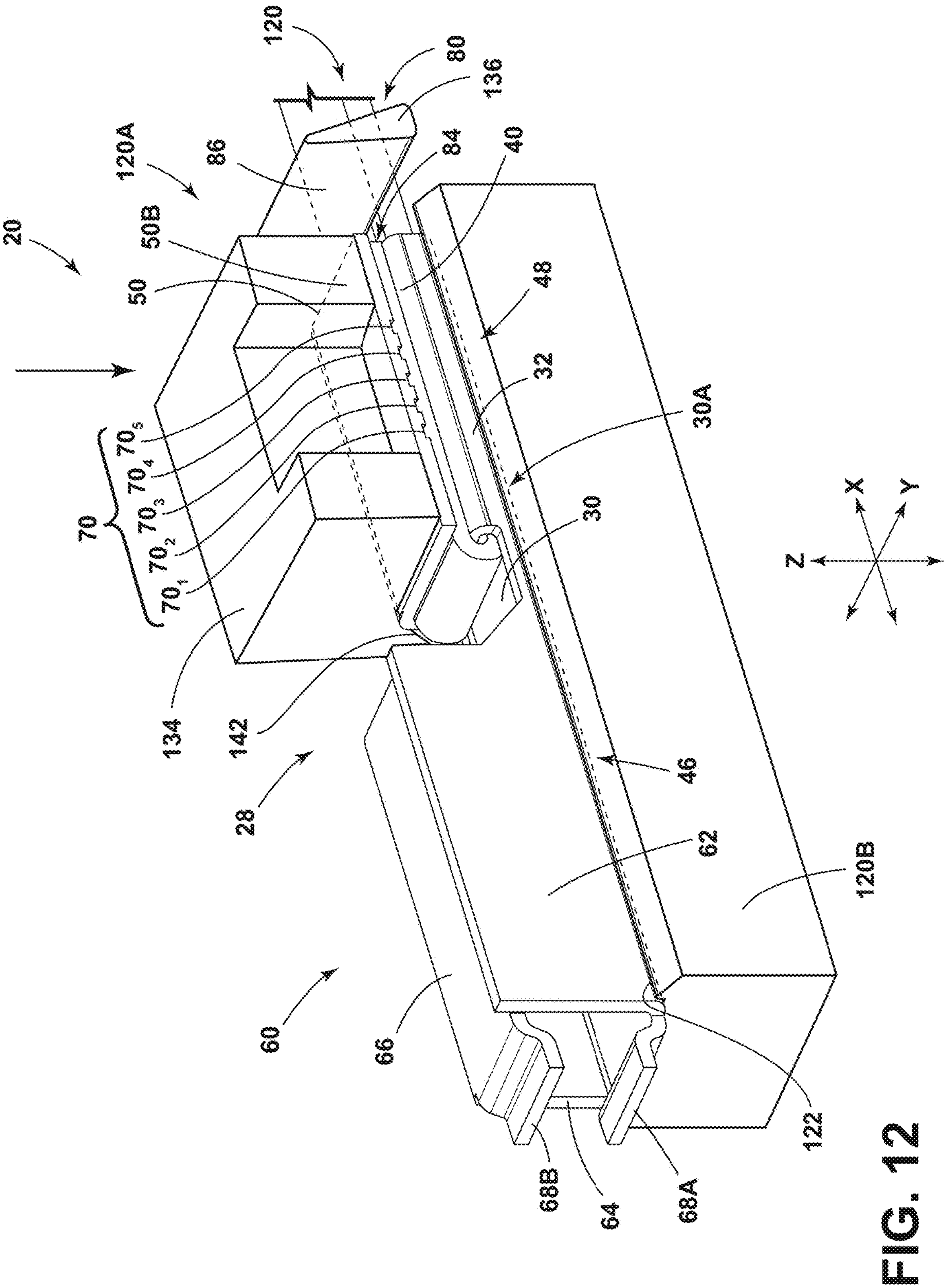
FIG. 12 is a perspective view generally illustrating portions of embodiments of an electrical assembly and a die according to teachings of the present disclosure.

With embodiments, such as generally illustrated in FIGS. 7A, 9, and 10, the first portion 130 may move in the Z-direction from an initial/raised position toward the terminal 28 and/or the lower portion 120B, such as to limit movement of the conductor 80 while portions of the terminal 28 are bent. For example and without limitation, the first portion 130 may be configured to substantially prevent the conductor 80 (e.g., the second connection portion 84) from overlapping in a Z-direction with the first wing 40, the second wing 50, the second portion 132, and/or the third portion 134, such as to prevent unintended crimping of the second connection portion 84. As generally shown in FIGS. 7A and 7B, the second portion 132 may include a first bending surface 140, and/or the third portion 134 may include a second bending surface 142. The bending surfaces 140, 142 may be angled (e.g., with respect to the Z-axis) such that upper portion 120A of the bending die 120 bends/deforms/crimps the first wing 40 and/or the second wing 50 as the upper portion 120A of the bending die 120 moves in the Z-direction.

In embodiments, such as generally illustrated in FIGS. 7A, 8, 9, 10, 11, and 12, the fourth portion 136 of the bending die 120 may be configured as a spacer and/or guide. The fourth portion 136 may include one or more of a variety of shapes, sizes, and/or configurations. For example and without limitation, the fourth portion 136 may be substantially triangular, curved, and/or rounded. The fourth portion 136 may be disposed in one or more of a variety of locations relative to the electrical assembly 20. The fourth portion 136 may facilitate keeping the conductor 80 separate from the connector portion 60. Additionally or alternatively, the fourth portion 136 may move in a X-direction, a Y-direction, and/or a Z-direction to at least partially limit movement of the conductor 80, such as during bending/crimping.

Figure 13:
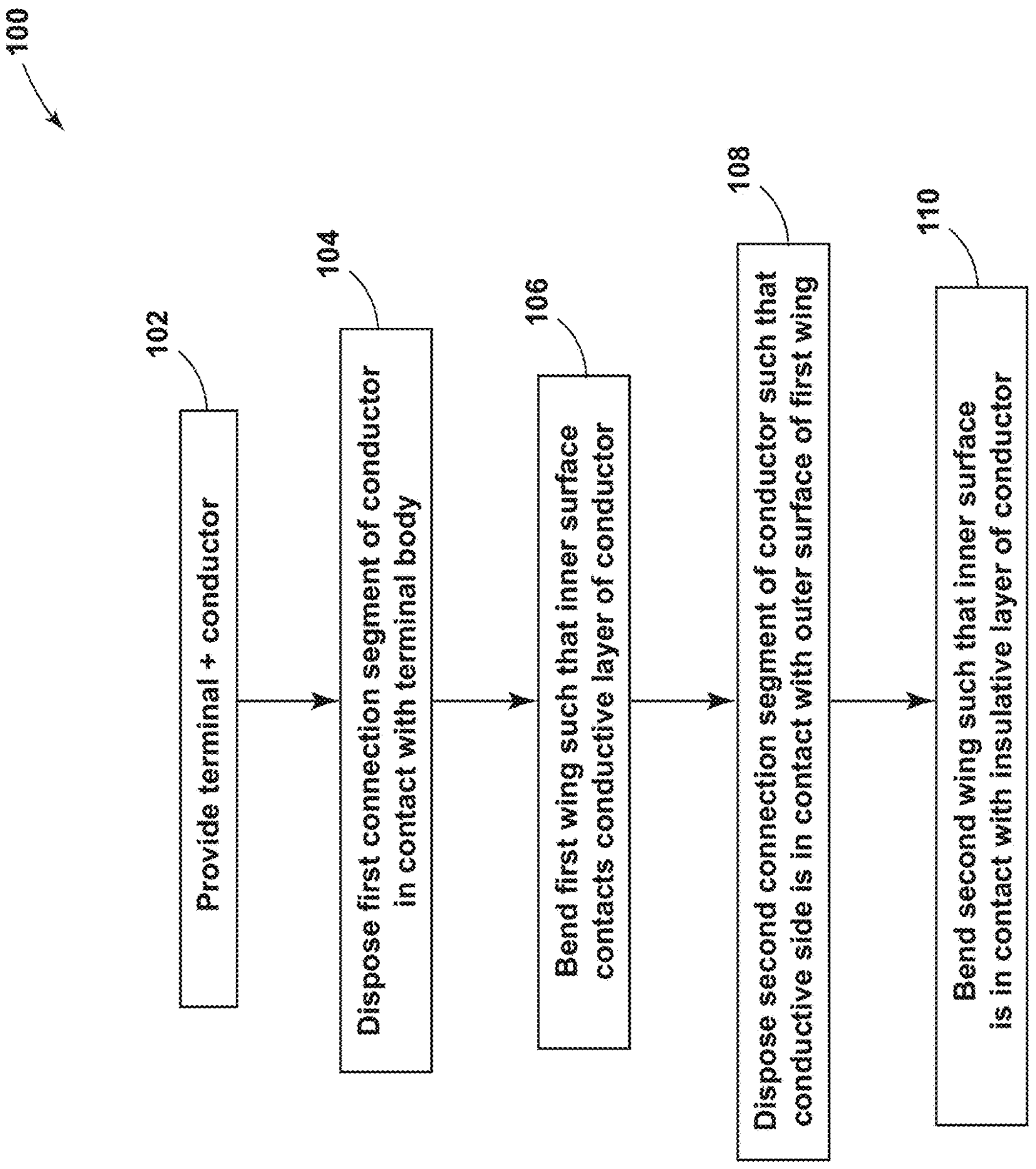
FIG. 13 is a flowchart generally illustrating an embodiment of a method of assembling an electrical assembly according to teachings of the present disclosure.

In embodiments, such as generally illustrated in FIG. 13, a method 100 of assembling an electrical assembly 20 may include providing a terminal 28 and a conductor 80 (step 102). The conductor 80 may include a first connection portion 82, a second connection portion 84, and/or a body 86. The method 100 of assembling the electrical assembly 20 may include disposing the conductor 80 at least partially in the terminal 28 and/or in contact with terminal body 30 (step 104). For example, the first connection portion 82 of the conductor 80 may be disposed substantially between (e.g., in a Y-direction) a first segment 32 of the terminal body 30 and a second segment 34 of the body 30 such that the first connection portion 82 is substantially parallel and/or in contact with the terminal body 30. The second connection portion 84 may, at least initially, be disposed at least partially between (e.g., in an X-direction) the connector portion 60 and the wings 40, 50 as the first connection portion 82 is connected with the first wing 40.

Figure 8:
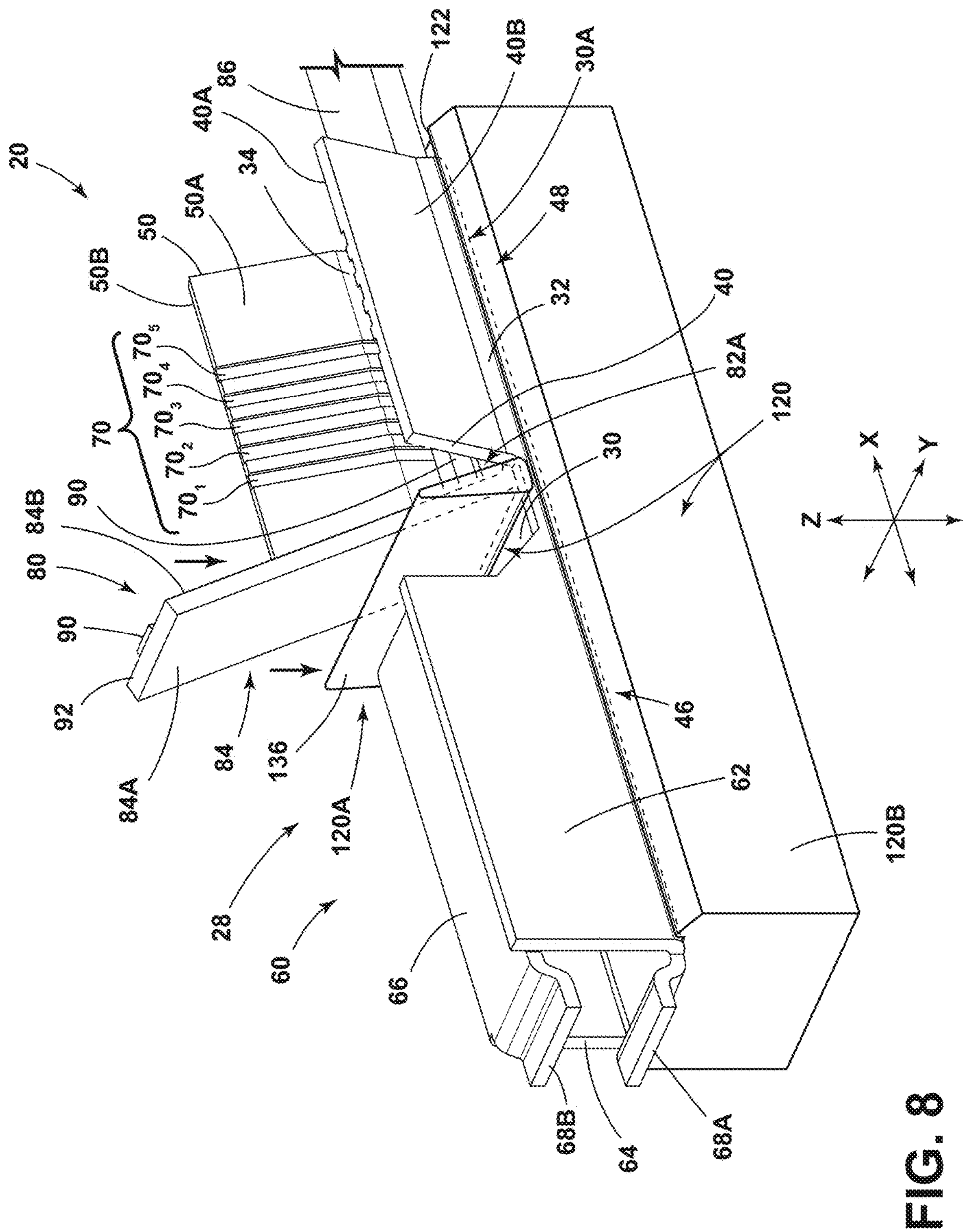
FIG. 8 is a perspective view generally illustrating portions of embodiments of an electrical assembly and a die according to teachings of the present disclosure.

With embodiments, prior to disposing the conductor 80 in contact with the terminal 28, the fourth portion 136 of the bending die 120 may be moved from an initial position (e.g., to the side of the terminal 28 and/or the lower portion 120B) to a first assembly position. The first assembly position of the fourth portion 136, the fourth portion 136 may be disposed at least partially between the connector portion 60 and the wings 40, 50, and/or in contact with the terminal body 30, the first wall 62, the second wall 64, and/or the third wall 66 (e.g., the fourth portion 136 may be disposed in a substantially vertical orientation such as shown in FIG. 8). The fourth portion 136 may move in an X-direction, a Y-direction, and/or Z-direction in moving from the initial position to the first assembly position. In some circumstances, the fourth portion 136 may, for example, move substantially only in a Y-direction from the initial position to the first assembly position.

In embodiments, in the first assembly position, the fourth portion 136 may be configured to guide movement (e.g. bending) of the second connection portion 84 of the conductor 80 in the Z-direction and/or away from the terminal body 30 as the conductor 80 is disposed in contact with the terminal body 30 and/or as the first portion 130 is moved toward the terminal 28. For example and without limitation, after and/or as part of disposing the conductor 80 in contact with the terminal body 30, the first portion 130 of the bending die 120 may be moved toward the terminal body 30, such as until the first portion 130 contacts the terminal 28 and/or the conductor 80. The first portion 130 may, for example, help ensure that the first connection portion 82 abuts the terminal body 30. The first portion 130 of the bending die 120 may be in contact with the second surface 84B of the second connection portion 84, and/or the fourth portion 136 of the bending die 120 may be in contact with the first surface 84A of the second connection portion 84. With embodiments, such as generally shown in FIGS. 8 and 9, the wings 40, 50 may generally extend at acute angles relative to the Z-direction as the first connection portion 82 is inserted between the first wing 40 and the second wing 50 and/or between the first segment 32 and the second segment 34.

In embodiments, a method 100 of assembling an electrical assembly 20 may include bending the first wing 40 (e.g., crimping, folding, rotating, etc. via the second portion 132 of the bending die 120) such that the first wing 40 is in electrical and/or mechanical contact with the first connection portion 82 (e.g., an inner/conductor layer 90 of the conductor 80) (step 106). Bending the first wing 40 may include bending the first wing 40 generally about 90 degrees such that an inner surface 40A of the first wing 40 contacts the first connection portion 82 (see, e.g., FIG. 10). When the second portion 132 of the bending die 120 moves towards the terminal 28 in the Z-direction, the first bending surface 140 (e.g., an angled/ramped surface) may contact the outer surface 40B of the first wing 40. Contact between the first wing 40 and the first bending surface 140 may bend the first wing 40 such that the first wing 40 bends to substantially parallel with the terminal body 30 and/or the first connection portion 82 of the conductor 80. Once the first wing 40 is in contact with the conductor 80 and/or substantially parallel with the conductor 80, the first portion 130 and/or the second portion 132 of the bending die 120 may move away from the terminal 28 and/or may no longer be in contact with the terminal 28 and/or the conductor 80. For example and without limitation, the first portion 130 and the second portion 132 may move in a Z-direction away from the terminal 28.

In embodiments, the method 100 may include disposing the second connection portion 84 in contact with an outer surface 40B of the first wing 40 (step 108). The second connection portion 84 may be moved (e.g., bent, angled, pulled, stretched, etc.), such as manually and/or with a machine 150 (e.g., via the fourth portion 136 of the bending die 120), about an axis that may be substantially parallel with a Y-direction such that the second connection portion 84 is substantially parallel and/or in contact with the outer surface 40B of the first wing 40 (see, e.g., FIG. 13). For example and without limitation, the fourth portion 136 of the bending die 120 may move from the first assembly position (see e.g., FIGS. 8-10) substantially in an X-direction away from the first end 46 of the terminal 28 to a second assembly position (see, e.g., FIG. 11). As the fourth portion 136 moves toward the second assembly position, the fourth portion 136 may bend the conductor 80 (e.g., the second connection portion 84) about the axis to an angle of about 180 degrees relative to the first connection portion 82. The first connection portion 82 and the second connection portion 84 may be disposed in a substantially antiparallel configuration (e.g., may be substantially parallel and extend in substantially opposite X-directions). The first connection portion 82 and the second connection portion 84 may be electrically connected with the first wing 40, and/or may be electrically connected with the connector portion 60 via the terminal body 30 and/or the first wing 40. A first layer 90 (e.g., a conductive layer) of the conductor 80 may be in electrical and/or direct contact with the inner surface 40A of the first wing 40 and/or the outer surface 40B of the first wing 40. The first layer 90 may, at least in some circumstances, be at least partially insulated from (e.g., by the second layer 92) and/or not in direct contact with the terminal body 30 and/or the second wing 50.

With embodiments, the method 100 may include bending the second wing 50 such that an inner surface 50A of the second wing 50 is in contact with the second connection portion 84 of the conductor 80 (see, e.g., FIG. 12) (step 110). The second wing 50 may be bent about 90 degrees or more or less, such as via the third portion 134 of the bending die 120. The second wing 50 may be bent in one or more of a variety of manners (e.g., by hand, by machine 150, etc.). Bending the second wing 50 may include the third portion 134 of the bending die 120 moving in a Z-direction towards the terminal 28 such that the second bending surface 142 contacts the second wing 50. The ramped/angled second bending surface 142 may bend the second wing 50 into contact with the conductor 80, such as without interference from the fourth portion 136 (e.g., in the second assembly position, the fourth portion 136 may be clear from movement of the third portion 134 of the bending die 120). The fourth portion 136 of the bending die 120 may retain, at least to some degree, the second connection portion 84 while the third portion 134 of the bending die 120 moves in the Z-direction to bend the second wing 50.

In embodiments, bending the second wing 50 into contact with the second connection portion 84 may provide a mechanical connection between the conductor 80 and the wings 40, 50. For example and without limitation, the second wing 50 may mechanically retain the conductor 80, and/or the first wing 40 may mechanically retain the conductor 80 and electrically connect the conductor 80 with the connector portion 60. One or more grooves 70 of terminal 28 (e.g., of the body 30, the first wing 40, and/or the second wing 50) may engage the conductor 80 to limit relative movement between the terminal 28 and the conductor 80 in at least one direction (e.g., an X-direction). Grooves 70 of the terminal body 30 and/or the second wing 50 may engage the second layer 92 (e.g., an electrical insulating layer) and/or grooves 70 of the first wing 40 may engage the first layer 90 and/or second layer 92.

With embodiments, a bending die 120 may be connected to and/or incorporated with a machine 150 (e.g., a press) that may be configured to actuate the bending die 120 (e.g., automatically), move a terminal 28, and/or move a conductor 80, such as to facilitate assembly of an electrical assembly 20 (see, e.g., FIG. 7B).

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. An electrical assembly, comprising:

a terminal, including:

a terminal body;

a first wing extending from the terminal body; and a second wing extending from the terminal body; and a conductor in electrical contact with the first wing;

wherein the conductor includes a conductive layer and an insulative layer;

the insulative layer is in contact with the first wing and the second wing of the terminal; and an inner surface of the first wing and an outer surface of the first wing are in direct contact with the conductive layer of the conductor.

2. The electrical assembly of claim 1, wherein the conductive layer is disposed substantially parallel to the insulative layer; and the conductive layer is disposed substantially along a middle portion of the conductor.

3. The electrical assembly of claim 1, wherein the first wing includes a first wing length;

the second wing includes a second wing length; and the second wing length is longer than the first wing length.

4. The electrical assembly of claim 1, further including a connector;

the connector extends from a first end of the terminal body; and the first wing and the second wing extend from a second end of the terminal body, opposite the first end.

5. The electrical assembly of claim 4, wherein the connector includes a first wall and a second wall extending from the terminal body and a third wall connecting the first wall to the second wall, such that the first wall, the second wall, the third wall, and a portion of the terminal body form a substantially rectangular connector.

6. The electrical assembly of claim 5, wherein the connector connects the conductor to a mating terminal to provide an electrical connection to the conductor.

7. The electrical assembly of claim 6, wherein the connector includes an extension for electrically connecting the mating terminal to the connector; and the extension extends from at least one of the first wall, the second wall, and the third wall.

8. The electrical assembly of claim 1, wherein the insulative layer of the conductor is disposed at least partially between the terminal body and the first wing.

9. The electrical assembly of claim 1, wherein the insulative layer of the conductor is disposed at least partially between the first wing and the second wing.

10. The electrical assembly of claim 1, wherein the inner surface of the first wing and an inner surface of the second wing include grooves;

the grooves of the first wing are engaged with the conductive layer; and the grooves of the second wing are engaged with the insulative layer.

11. The electrical assembly of claim 1, wherein the second wing is not in direct contact with the conductive layer.

12. The electrical assembly of claim 1, wherein the conductor includes a first connection portion and a second connection portion;

the second connection portion overlaps with the first connection portion in a direction substantially perpendicular to the terminal body.

13. The electrical assembly of claim 12, wherein the first connection portion and the second connection portion each include a portion of the conductive layer and a portion of the insulative layer.

14. The electrical assembly of claim 13, wherein the conductor and the insulative layer of the conductor are substantially planar; and two portions of the conductive layer and two portions of the insulative layer overlap in a direction perpendicular to the terminal body.

15. An electrical assembly, comprising:

a terminal, including:

a terminal body;

a first wing extending from the terminal body; and a second wing extending from the terminal body; and a conductor in electrical contact with the first wing;

wherein the conductor includes a conductive layer and an insulative layer;

the insulative layer is in contact with the terminal; and an inner surface of the first wing and an outer surface of the first wing are in direct contact with the conductive layer of the conductor, wherein the terminal body includes a first segment and a second segment that extend substantially perpendicular to the terminal body; and the conductive layer is not in contact with the first segment or the second segment.

16. The electrical assembly of claim 15, wherein the first wing bends at a connection with the first segment;

the second wing bends at a connection with the second segment; and the first segment and the second segment are relatively fixed in relation to the terminal body.

17. An electrical assembly, comprising:

a terminal, including:

a terminal body;

a first wing extending from a first end of the terminal body;

a second wing extending from the first end of the terminal body;

a conductor in electrical contact with the first wing; and a connector extending from a second end of the terminal body;

wherein the connector provides an electrical connection to the conductor;

the conductor includes a conductive layer and an insulative layer, the insulative layer in contact with the first wing and the second wing of the terminal; and the second wing is not in electrical contact with the conductive layer.

18. The electrical assembly of claim 17, wherein a portion of the insulative layer is in contact with the terminal body and with an inner surface of the first wing; and a second portion of the insulative layer is in contact with an outer surface of the first wing and an inner surface of the second wing.

19. The electrical assembly of claim 17, wherein the conductive layer is disposed substantially parallel to the insulative layer; and the conductive layer is disposed substantially along a middle portion of the conductor.

20. The electrical assembly of claim 17, wherein the connector includes a terminal, and the terminal at least partially retain the conductor.

* * * * *